Dec. 16, 1952     I. KIWAD     2,621,714
COMBINATION AUTOMOBILE BACK PROTECTOR AND SEAT
Filed June 8, 1951
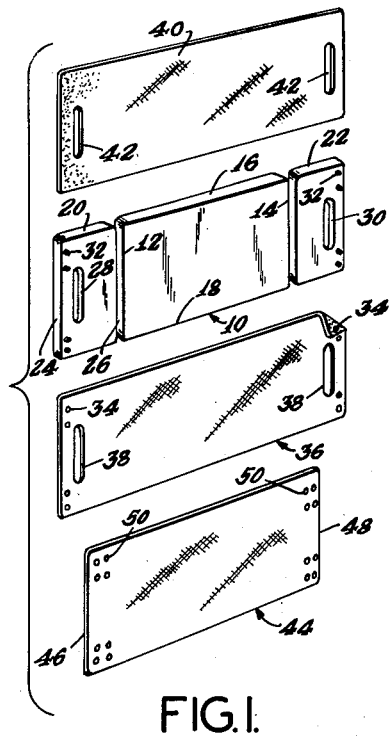
FIG.I.
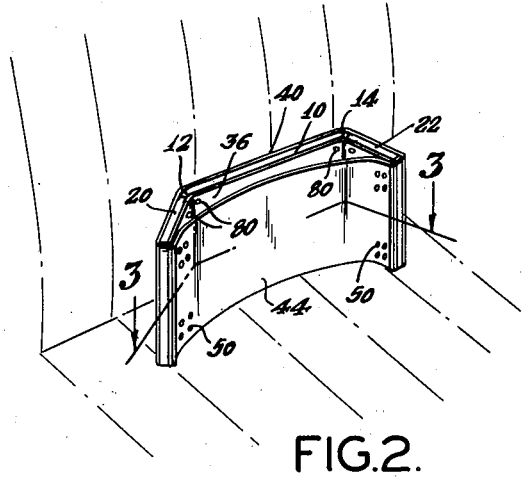
FIG.2.
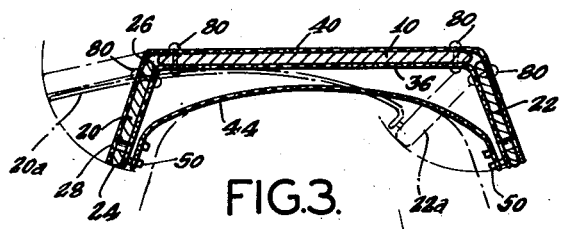
FIG.3.
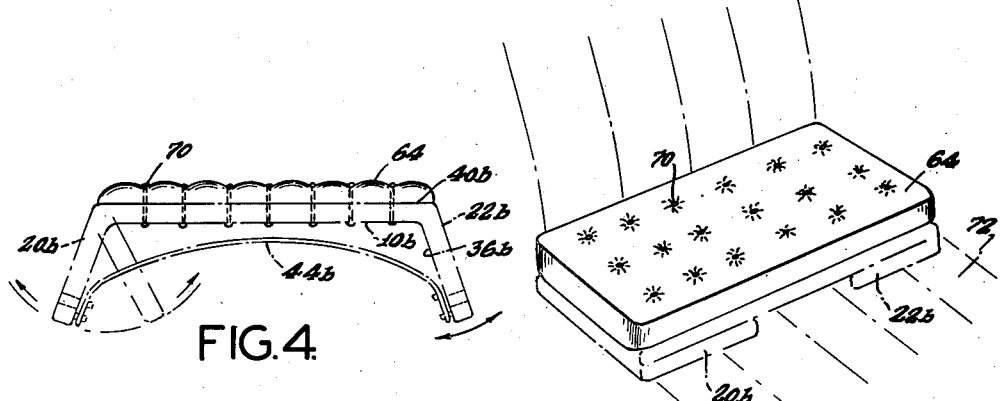
FIG.4.     FIG.5.
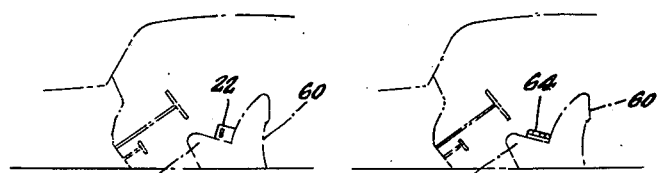
FIG.6.     FIG.7.
INVENTOR.
ISADORE KIWAD
BY
*A. Winturn*
ATTORNEY.

Patented Dec. 16, 1952

2,621,714

UNITED STATES PATENT OFFICE 2,621,714

COMBINATION AUTOMOBILE BACK PROTECTOR AND SEAT

Isadore Kiwad, Westwood, N. J.

Application June 8, 1951, Serial No. 230,577

6 Claims. (Cl. 155—182)

1

This invention relates generally to back rest and back support devices and has for one of its objects the provision of a novel and improved seating device accessory in the nature of a back rest and support adapted for being carried by or supported upon a seating device such as a chair, sofa, automobile seat, or the like.

Another object of the invention is to provide a novel and improved back rest for use with seating devices, so as to maintain the back of the person using the same in a predetermined space relationship to the surface of the seating device upon which it is used, so as to avoid direct contact engagement therewith, and at the same time to furnish positive support for the back and sides of the user.

A further object of the invention is to provide a novel back rest including substantially rigid sheet members flexibly hinged together by novel and unusual construction, one of the rigid sheet members being disposed for supporting the back of the user, and the other rigid sheet members being disposed for providing additional side support, with a flexible sheet member interconnecting the two side support rigid members for direct contact engagement with the user's back.

Still another object of the invention is to provide a novel form of back rest and support for use by the driver of an automobile, the device including a main rigid base member, with two side wing members, pivotally secured to opposite edges of the main base member, and with a flexible fabric sheet member extending between the two wing members and secured thereto at opposite ends, the composite arrangement being such that as the device is placed upon the seat with its main rigid base member in an upright position, the flexible fabric sheet member forms a direct flexible support for the user's back in normally spaced relationship to the back of the seat itself, yet which at the same time permits left and right flexure to allow freedom of swaying or turning movement of the driver of the car as needed, without binding or friction.

Still a further object of the invention is to provide a novel and improved automobile seat back rest of the character described, which may be folded compactly to form a separate or auxiliary cushioned seat to elevate the driver as needed, or which may be used for any other desired purpose.

Still another object of the invention is to provide a novel and improved automobile seat back support and cushion device of the character described, which is simple in design, inexpensive to manufacture, and which is effective for its intended purpose of increasing the comfort and convenience of the motor vehicle driver.

These and other objects and advantages of the invention will become apparent from the following description of a preferred embodiment thereof as illustrated in the accompanying drawings, forming a part hereof, and in which, Fig. 1 is an exploded or separational view of the main structural elements forming a preferred embodiment of the device, prior to assembly thereof.

Fig. 2 is a perspective view of a portion of a seat of an automobile with my novel and improved back rest device disposed thereon in position for immediate use.

Fig. 3 is a cross-sectional view taken substantially on the line 3—3 of Fig. 2, and indicating in broken lines the possible flexure of the various members of the device.

Fig. 4 is a top plan view showing a modified form of the invention and indicating in broken lines the possible flexure thereof.

Fig. 5 is a perspective view showing a seat of an automobile, with the device of Fig. 4 in position upon the seat thereof, showing the wings folded up and the cushioned portion of the device uppermost.

Fig. 6 is a fragmentary broken out schematic or diagrammatic side elevational view of a portion of a motor vehicle, with the device of Figs. 2 and 4 disposed on the vehicle seat for supporting the back of the user.

Fig. 7 is a view similar to that of Fig. 6, but showing the modified form of the invention of Fig. 5, forming a cushion on the seat and illustrating the manner of its use.

In the use of seating devices such as sofas, chairs, the seats of automobiles, and the like, it has been found that the person using them is not always comfortable, that he tires quickly, and that he cannot move about or turn as freely as he might desire. This is because he is somewhat wedged into the upholstered seat, with his back resting against the fabric of the seat back itself, and without proper and suitable support for the back.

When seated in the driver's seat of a motor vehicle, it is frequently necessary for the driver to turn his head and body to look out of the back or side windows, and when he wishes to enter or leave the car further turning and sliding motion is necessary. Without proper back support for his spine and back muscles, he is fatigued on long tours, so that by the time he arrives at his destination he is thoroughly tired out.

The present invention overcomes all these difficulties by providing a comfortable auxiliary back rest for use in motor vehicles, and the like. Also the construction and arrangement is such that the device may be folded up in such manner that it may be employed as a seat member designed to elevate the driver so that he may more easily look over the upraised cowls of the present day vehicle or for other desired reasons. In order to understand clearly the nature of the invention and the best means for carrying it out, reference may now be had to the drawings, in which like numerals denote similar parts throughout the several views.

As shown in Figs. 1, 2 and 3, I provide a main base member 10 of suitable substantially rigid sheet material such as plywood, pressed-wood, metal or other material, which may be substantially rectangular as shown with sides 12 and 14 intersecting with top and bottom edges 16 and 18. I also provide left and right side wing members 20 and 22, which may also be rectangular as seen in Fig. 1, but somewhat narrower in extent between their side edges such as 24 and 26, than the length of the main base member 10, as shown. Vertically elongated slots or openings 28 and 30 are formed through the wing members 20 and 22 as shown, to allow for being grasped by the hand of the user as needed, as will be explained more fully hereinafter. Male snap fastener elements 32 may be secured to one or more faces of the wing members 20 and 22 as shown in Fig. 1, to engage with corresponding female snap fastener elements 50 carried by a flexible back supporting cross member, the function and purpose of which will become apparent hereinafter. A front covering sheet member 36 made of suitable relatively thin sheet material such as cloth, canvas, plastic or the like, sufficiently large as to overlie the three members 16, 20 and 22 when in the positions shown in Fig. 1 when placed thereover is provided. It is seen that the member 36 also has cut-out hand holes or slots 38 formed therein designed to be in alignment with the openings 28 and 30 in the wing members 20 and 22. Suitable openings 34 are also provided to receive the snap fastener elements 32 therethrough.

A backing sheet member 40 is also provided, and is similar in size and shape to the fabric sheet member 36, including the hand holes 42 which are arranged to underlie the holes 28 and 30 of the wing members 20 and 22 when in assembled positions. The backing sheet member 40 and the front covering sheet member 36 may be secured to opposite surfaces of the members 16, 20 and 22, by any suitable means, such as adhesively, or otherwise, and it is thus seen that when the members 16, 20 and 22 are sandwiched between the two layers 40 and 36 in the manner of Figs. 2 and 3, the wings 20 and 22 will be pivotally engaged so that they can turn and flex pivotally about a substantially vertical pivot or hinge thus formed at the left and right edges 12 and 14 of the main base member 10.

The back supporting cross member 44, formed of flexible sheet material such as heavy canvas, plastic or other suitable material, is substantially rectangular in shape as seen in Fig. 1, but is not quite as long from left to right between its side edges 46 and 48, as the combined members 16, 20 and 22 being however, substantially longer in lateral extent than the distance between edges 12 and 14 of the main base member. The said member 44 is provided with snap fastener elements such as 50 to engage with corresponding snap fastener elements 32 on the members 20 and 22 in the manner of Figs. 2 and 3, and since the sheet 44 is of less length than the combined members 16, 20 and 22, the wings 20 and 22 and their underlying and overlying fabrics 36 and 40 will of necessity be pivotally moved inwardly somewhat as seen in Figs. 2 and 3, so that the sheet member 44 is normally spaced from the central portion of the sheet member 36 and hence from the main base member 10, as seen in full lines in Figs. 2 and 3, providing a hammock-like support for the back of the user, when the device is placed in upright position upon the seat of an automobile.

It is thus seen from the above described construction that the back of the user of my device is not only resiliently supported but in addition, the curvature of the member 44 along its sides, induced by the outfolding of the wings 20 and 22 is such that when the user presses backward against the hammock member 44 there will be automatically provided hugging snug support for the side portions of his torso. Further, when the driver needs to move to either side, or to turn, the wings 20 and 22 will move pivotally about their axes as shown in broken lines in Fig. 3, allowing him to slide along his seat to the left or right, as he might do in getting into the seat or getting out, without dragging the device itself along with him. As a result he is given a maximum degree of comfort at all times. When not in active use the device may be collapsed by folding the wings 20 and 22 inwardly to overlie the member 16 and stored.

As noted in Figs. 1, 2 and 3 the member 44 is provided with two parallel rows of fastener elements 50 so that either the inner or outer row of elements may engage the fastener elements 32 on the members 20 and 22. There is thus provided means for adjustment depending upon the size of the user.

Looking at Fig. 6 it is seen that the device of Fig. 2 rests upon the car seat 60 in the position shown, as a back rest and support for the driver.

In Figs. 4, 5 and 7 I have shown a modified form of my invention in which the construction is the same as that shown in Figs. 2 and 3, except that a padding or cushion material 64 is secured to the outer surface 40b of the backing layer 40 by any suitable means, such as upholstery cords 70 of the type well known to the upholstery art. Now, when the device is to be used as a back rest and support, it is placed in upright position as in Figs. 2, 3 and 6, upon the seat, so that the driver's back rests thereagainst. However, when he wants to be elevated somewhat, for example, then he has only to fold under the wings 20b and 22b in the manner shown in Fig. 5, and place them upon the seat bottom portion 72, with the cushioned portion 64 uppermost. He then sits thereupon in elevated position.

If desired, and in addition to the adhesive employed for attaching the sheets 36 and 40, eyelets 80 (see Figs. 2 and 3) may be employed, the said eyelets passing through the sheets 36 and 40 as well as the members 16, 20 and 22 adjacent to the point where the members 20 and 22 are hinged to the member 16.

Although I have described my invention in specific terms, it will be understood that various changes may be made in size, shape, materials and arrangement without departing from the spirit and scope of the invention. It is also understood that rivets, eyelets 80 or other suitable fastening means may be employed as shown in Fig. 3, to penetrate the layers 40 and 36 and the underlying members 10 or 20 or 22, to secure them together against separation at this location as needed, under any stress encountered.

I claim:

1. A back rest device comprising a main base formed of substantially rigid sheet material, a plurality of wing members formed of substantially rigid sheet material, means for supporting said wing members for pivotal motion about opposed edges of said main base member, and lateral support means connected at opposite ends thereof directly to said wing members and in spaced relation to said main base member, whereby the back of a user may be supported by said lateral support means and at the same time cause the said wing members to engage the sides of the user.

2. The construction according to claim 1, wherein said pivotally supporting means comprises a layer of flexible sheet material overlying and secured to the surfaces of said main base member and said wing members, so that each of said wing members is free to pivot about an axis forming substantially the intersection of either wing member with said main base member.

3. The construction according to claim 2, wherein said lateral support means comprises a sheet of flexible material which is lesser in length than the combined lengths of said wing members and said main base member, and wherein resilient cushion material is attached to said main base whereby, upon folding said wing members toward each other, the same may be placed upon a seat to provide an additive cushion.

4. The construction according to claim 1, wherein said pivotally supporting means comprises a first layer of flexible sheet material overlying and secured to the outer surfaces of said main base member and said wing members, and a second layer of flexible sheet material overlying and secured to the inner surfaces of said main base member and said wing members, so that each of said wing members is free to pivot about the axis of intersection with said base member, and wherein cooperating fastening elements are carried jointly by said lateral support means and said wing members so that interengagement therebetween at the ends of said lateral support means is effected as desired, so as to normally effect angularity between said wing members and said main base member.

5. The construction according to claim 1, wherein said lateral support means comprises a sheet of flexible material carrying cooperating fastener means, the other cooperative fastener means being carried by said wing members for engagement therewith, said lateral support means being substantially smaller in lateral extent than the combined length of said wing members and said main base member when substantially contiguously disposed.

6. The construction according to claim 1, wherein said lateral support means comprises a sheet of flexible material which is lesser in length than the combined lengths of said wing members and said base member.

ISADORE KIWAD.

REFERENCES CITED

The following references are of record in the file of this patent:

UNITED STATES PATENTS

| Number | Name | Date |
|---|---|---|
| 2,182,253 | Farrell | Dec. 5, 1939 |